United States Patent
Pagels et al.

(10) Patent No.: US 12,376,599 B2
(45) Date of Patent: Aug. 5, 2025

(54) APPARATUS AND METHOD FOR AUTOMATICALLY RECOVERING FLESH FROM BEHEADED AND EVISCERATED FISH

(71) Applicant: NORDISCHER MASCHINENBAU RUD. BAADER GMBH + CO. KG, Lübeck (DE)

(72) Inventors: Mirko Pagels, Lübeck (DE); Valeri Krahn, Lübeck (DE); Ulrich Gütte, Lübeck (DE)

(73) Assignee: Nordischer Maschinenbau Rud. Baader GmbH & Co. KG, Lübeck (DE)

( * ) Notice: Subject to any disclaimer, the term of this patent is extended or adjusted under 35 U.S.C. 154(b) by 0 days.

(21) Appl. No.: 18/249,343

(22) PCT Filed: Oct. 19, 2020

(86) PCT No.: PCT/EP2020/079396
§ 371 (c)(1),
(2) Date: Apr. 17, 2023

(87) PCT Pub. No.: WO2022/083848
PCT Pub. Date: Apr. 28, 2022

(65) Prior Publication Data
US 2023/0389561 A1    Dec. 7, 2023

(51) Int. Cl.
*A22C 25/08*    (2006.01)
*A22C 25/16*    (2006.01)

(52) U.S. Cl.
CPC .............. *A22C 25/16* (2013.01); *A22C 25/08* (2013.01)

(58) Field of Classification Search
CPC ........ A22C 25/08; A22C 25/16; A22C 25/166
(Continued)

(56) References Cited

U.S. PATENT DOCUMENTS

| 3,665,557 A | * | 5/1972 | Uekusa | A22C 25/16 |
| | | | | 452/158 |
| 4,649,603 A | * | 3/1987 | Bartels | A22C 25/14 |
| | | | | 452/121 |

(Continued)

FOREIGN PATENT DOCUMENTS

| DE | 943612 C | 5/1956 |
| DE | 19745891 A1 | 4/1999 |

(Continued)

OTHER PUBLICATIONS

English translation of WIPO document No. 2018/219907, to Jurs et al. published Dec. 6, 2018.*

*Primary Examiner* — David J Parsley
(74) *Attorney, Agent, or Firm* — Dinsmore & Shohl LLP

(57) ABSTRACT

An apparatus for automatically recovering meat from headed and gutted fish comprises: a transport device for transporting the fish along a transport path in a transport direction; a measuring device for detecting an anatomy of the fish; and a detaching device for detaching the meat from a bone structure of the fish, wherein the detaching device comprises at least two circular knives which are spaced apart from each other on mutually opposing sides of the transport path to form a gap S; wherein: the detaching device comprises a control device to adjust a width of the gap S depending on the anatomy of the fish, the control device is configured to pre-adjust the width of the gap S before the meat is detached from the bone structure and wherein the control device is configured to vary the width of the gap S while the meat is being detached.

23 Claims, 6 Drawing Sheets

(58) Field of Classification Search
USPC .................................................. 452/161, 162
See application file for complete search history.

(56) References Cited

U.S. PATENT DOCUMENTS

| | | | | |
|---|---|---|---|---|
| 4,748,723 | A * | 6/1988 | Braeger | ............... A22C 25/166 452/152 |
| 5,088,958 | A * | 2/1992 | Evers | .................... A22C 25/16 452/160 |
| 5,149,297 | A | 9/1992 | Braeger | |
| 5,536,205 | A * | 7/1996 | Braeger | ................. A22C 25/16 452/136 |
| 6,200,211 | B1 * | 3/2001 | Braeger | ................. A22C 25/16 452/161 |
| 6,322,437 | B1 | 11/2001 | Maschinenbau | |
| 8,272,928 | B2 * | 9/2012 | Finke | .................... A22C 25/16 452/161 |
| 8,298,050 | B2 * | 10/2012 | Jurs | ........................ A22C 25/16 452/162 |
| 8,956,205 | B2 * | 2/2015 | Kowalski | ............... A22C 25/16 452/135 |
| 9,078,454 | B2 * | 7/2015 | Jurs | ........................ A22C 25/16 |
| 10,051,872 | B2 | 8/2018 | Maschinenbau | |
| 2018/0153182 | A1 | 6/2018 | Finke | |
| 2023/0000094 | A1 | 1/2023 | Maschinenbau | |

FOREIGN PATENT DOCUMENTS

| | | |
|---|---|---|
| DE | 19881497 C1 | 4/2003 |
| DE | 102007053904 B3 | 1/2009 |
| DE | 102007053905 B3 | 1/2009 |
| DE | 102015106010 A1 | 10/2016 |
| EP | 0711502 A1 | 5/1996 |
| GB | 1100146 A | 1/1968 |
| WO | 2011151221 A1 | 12/2011 |
| WO | 2018219907 A1 | 12/2018 |
| WO | 2021110672 A1 | 6/2021 |

* cited by examiner

APPARATUS AND METHOD FOR AUTOMATICALLY RECOVERING FLESH FROM BEHEADED AND EVISCERATED FISH

CROSS-REFERENCE TO RELATED APPLICATIONS

This application is the U.S. National Stage of PCT/EP2020/079396 filed on Oct. 19, 2020, the entire content is incorporated herein by reference in its entirety.

FIELD OF THE INVENTION

The present invention relates to an apparatus for automatically recovering meat from headed and gutted fish, comprising a transport device for transporting the fish along a transport path in transport direction T, a measuring device for detecting the anatomy of the fish, and a detaching device for detaching the meat from the bone structure, the detaching device comprising at least two rotatingly driven and controllably moveable circular knives which are spaced apart from each other on mutually opposing sides of the transport path to form a gap S.

The invention further relates to a method for automatically recovering meat from headed and gutted fish, comprising the steps: Transporting the fish along a transport path in transport direction T by means of a transport device, detecting the anatomy of the fish, in particular the height, length and/or width of the fish, by means of a measuring device, detaching the meat from the bone structure by means of a detaching device, the detaching device comprising at least two rotatingly driven and controllably moveable circular knives which are spaced apart from each other on mutually opposing sides of the transport path to form a gap S.

BACKGROUND OF THE INVENTION

Such apparatuses and methods are used, for example, when performing knife cuts during the automatic filleting of fish. In the fish processing industry, such apparatuses and methods are specifically used to recover the meat or the fillets or at least parts thereof from headed and at least partially or mainly gutted fish. In other words, the apparatuses and methods referred to are the basis or a component part of recovering fillets from gutted and headed fish. For this, the fish are automatically processed on the ventral side and/or dorsal side in that the meat attached to the bone structure is detached and stripped therefrom by detaching devices. The fish are usually fed to such detaching devices head-first or tail-first by means of transport devices; alternatively, it is also possible in principle to transport the fish sideways. The already headed, slaughtered fish with opened abdominal cavities are conveyed to the individual processing stations required for the filleting process and, in doing so, usually pass through at least two different detaching devices for performing knife cuts in order to recover the meat of the fish accordingly as a result.

An apparatus for recovering meat from headed and gutted fish is described in DE 198 81 497 C1. For recovering meat from headed and gutted fish, this apparatus uses a pivotable or tiltable adjusting option of the circular knives to enable variable adjustment of the distance of the circular knives relative to each other when setting up the apparatus. For this purpose, the circular knives are variable in orientation about their substantially horizontal axis. Viewed in transport direction T of the fish, the circular knives can thus be pivoted or tilted out of and back into a parallel arrangement, in which the circular knives are at the same distance relative to each other at every point of the circumference, into a v-shaped position, in which the circular knives have, for example, the smallest distance from each other at their lowest knife point. Due to the pivotability of the circular knives, the angle of both circular knives relative to each other is variable, but the cutting control is limited by the variable angle depending on the distance of the circular knives relative to each other. There is the further drawback that the distance between the two circular knives in the region of the smallest gap distance, usually at the lowest knife point of the two circular knives, is to be fixedly adjusted to a fixed minimum gap size suitable for different fish sizes. In other words, the position/orientation of the circular knives relative to each other during the detaching or cutting process is unchangeable with respect to the position of the point of the smallest gap distance. This means that there is no way of conveniently and automatically changing the distance at short notice. It is also not possible with the prior art to cater for different fish sizes or fish species within the fish to be processed.

In the case of different fish species, the known apparatuses and methods, as can be seen from DE 10 2015 106 010 A1, result in particularly high yield losses and/or injuries to the bone structure or the fins/fin supports/fin seams during the recovery of meat due to the fixed orientation/position of the circular knives relative to each other regarding the position of the point of the smallest distance which can lead to contamination of the meat to be recovered or production downtimes. This problem occurs, for example, when processing salmon, white fish and, in particular, cod in which the backbone has a shape which varies from tail to head. Due to the rigid orientation of the circular knives in respect of the position of the point of the smallest gap size, the result is incorrect incisions and/or yield losses in the region of the backbone. Furthermore, it is only possible to a limited extent to reliably process salmon with the known apparatuses since they frequently have different dimensions, which is why there is regularly a need for pre-sorting because the apparatuses cannot carry out such adjustments of the detaching devices that result in recovering the meat as completely as possible.

Furthermore, spring-loaded circular knives are known in prior art which are supposed to result in yield increases. Even in such apparatuses, there is a fixed orientation of the circular knives relative to each other which significantly limits the maximum range of fish to be processed. In addition, pivoting of the circular knives about the horizontal axis only offers the possibility of varying the distance in the width of the gap which, however, is also accompanied by a change in cutting control. The known apparatuses offer only relatively few possibilities for performing individual cutting controls. In the case of fish species such as salmon, there are particularly fleshy regions in the region of the backbone (which in the following is also referred to as the central bone or spine), particularly in the region between tail and dorsal fin, which can only be harvested unsatisfactorily with the known apparatuses and methods.

Therefore, for the reasons mentioned, after processing with the known apparatuses or the known methods, portions that consist purely of meat which cannot be recovered continue to exist in the region of the backbone. The known apparatuses orient themselves, when aligning the circular knives, to a defined distance from the first cut of the tail root up to the end of the head cut, which results in yield losses during subsequent processing with the circular knives. Particularly in the region of the tail root up to the region of the dorsal fin, reliable and high-yield recovery of the meat is not possible due to "inadjustability" of the distance between the circular knives. Rapid adjustability of the distance between the circular knives is not provided with the existing apparatuses, nor can it be implemented, without major mechanical effort. At present, the problem is counteracted by time-consuming pre-sorting of the raw material in order to achieve the best possible yield result with the uniform distance between the circular knives. However, if the distances between the knives are too small, speed losses can occur in the filleting process when a circular knife comes into contact with the bone structure of the fish, which leads to cutting errors if the knife cutting speeds are unevenly distributed. Furthermore, the slowed down cutting speed can lead to imprecise cuts or tearing of the meat which results in quality losses. If, on the other hand, the circular knives are aligned too far apart from each other, high yield losses can occur due to insufficient meat recovery which can at best be mitigated by mechanical recovery of the residual meat with separators, leading in turn to high costs or quality losses in the end product.

SUMMARY OF THE INVENTION

It is therefore the object of the present invention to propose an apparatus for fish processing which ensures reliable and yield-efficient automatic recovery of meat, whereby the meat should be separated or detached as completely as possible from the bone structure of the fish. The object is further to propose a corresponding method.

The object is achieved by an apparatus referred to hereinbefore in that the detaching device comprises a control device, which is adapted to adjust the width of the gap S depending on the fish anatomy detected by the measuring device, in particular the height, length and/or width of the fish, the control device being configured to pre-adjust the width of the gap S before the meat is detached from the bone structure and the control device being configured to vary the width of the gap S while the meat is being detached from the bone structure. This offers the advantage that, on the one hand, the at least two controllably moveable circular knives are optimally pre-adjusted, depending on the fish anatomy of the fish to be processed, for performing a detaching cut for detaching the meat from the bone by means of the detaching device and, on the other hand, the at least two controllably moveable circular knives are optimally varied while the meat is being detached from the bone structure. In this way, the width of the gap S located between the at least two circular knives is adjusted relative to each other such that a detaching cut is achieved with high precision. Due to the variable width of the gap S, the best possible yield is always achieved when recovering the meat, irrespective of the fish anatomy and size of the headed and gutted fish. At the same time, the width of the gap S is preferably selected in such a manner that the circular knives detach the meat from the bone structure of the fish as closely as possible without damaging or cutting into the bone structure or parts thereof. In this way, the waste or undetached meat adhering to the bones after recovery of the meat can be reduced, thus increasing the yield during meat recovery. On the one hand, this leads to higher efficiency of the apparatus and, on the other hand, it reduces the effort required for any possible downstream recovery of the residual meat remaining on the bone structure. In this way, the quality of the end product can also be increased as larger connected portions of meat are recovered. The apparatus according to the invention ensures individual and customised adjustment of the width of the gap S with regard to the fish anatomy, in particular the height, length and/or width of the fish or the location/position of the fish, so that each fish can be processed individually which leads to optimised results in terms of yield and quality. Achievement of the object according to the invention allows dynamic adjustment of the distance between the circular knives without time-consuming changeovers. In particular, due to adjustability of the circular knives by the control device, it is possible to vary the distance without using tools. Since the control device provides adjustability or variability of the width of the gap S, i.e. adjustment is possible before fish processing and during fish processing, the gap S can be pre-adjusted or varied individually and customised over the course of processing, depending on the detected fish anatomy of the fish to be processed. In other words, the gap S can be adjusted starting from a pre-adjusted gap width, i.e. depending on the anatomy of the fish, the gap S can be increased or reduced in the course of processing, so that the meat of the fish is detached as completely as possible from the bone structure. Simply put, the invention enables product-specific pre-adjustment/variation of the gap S formed by the circular knives with the effect of yield-efficient and adaptable recovery of the meat, depending on the fish anatomy present. In this case, the width of the gap S should be selected so that, during a detaching cut or separating cut, the gap S is selected at least in sections or temporarily to be so large that on the one hand damage, for example to fin supports, can be excluded and so small that on the other hand the maximum yield is achieved.

"Fish" within the meaning of the invention basically covers all (edible) fish species which are suitable for industrial/mechanical processing. Fish species that can be used include white fish, e.g. cod or haddock. The apparatus can also be used, however, in the same manner for other species of fish, in particular salmon. The headed and gutted fish each have different fish anatomies, determined in particular by age, gender, fish species, origin, diet and gene pool. In this case, the fish anatomy includes fish anatomical features or parameters of the fish. Thus, "fish anatomy" means, in particular, the height, length and/or width of the fish. The apparatus according to the invention is configured and adapted for processing the meat of the fish or at least parts thereof, based on their specific fish anatomy. For this purpose, the apparatus is provided with the fish already headed and at least partially or mainly gutted. Depending on the configuration of the apparatus, gutting and heading apparatuses can be arranged directly upstream in a processing line.

All devices which are suitable to transport the fish in a certain direction along the transport path can be considered as a transport device. For example, the fish can be positioned or arranged on a holding apparatus comprising the transport device. The transport device preferably comprises a drive means and a continuous transport means for conveying the fish or the holding apparatuses along the transport path.

"Measuring device" means a mechanical, electrical and/or electronic device which is configured to detect the fish anatomy. The measuring device is configured to detect and/or determine fish-size-relevant data and detects the fish anatomy preferably in the form of one or more data sets in order to more preferably store them and to subsequently make them available for further uses. In this case, the fish anatomy data include not only the size of the fish with length, height, width, etc., but also in particular proportions, shapes, colouring and consistencies of the fish to be processed. The fish anatomy data are preferably stored in a database. The parameters of the fish anatomy to be detected by the measuring device should cover in particular parameters for customised actuation of the circular knives, it being explicitly possible to include further parameters which can be used in further processing steps. The aim is to detect the fish anatomy in the best way possible in order to localise the meat regions so as to then detach them by means of the detaching device with as little loss and destruction as possible; more preferably, the measuring device can be configured to localise the bone structure or bones in order to then adjust the corresponding recovery of meat to localisation of the bones. Depending on the fish parameters to be detected, the respective measuring device comprises suitable detection systems, such as sensor systems, rotary encoders, optical detection modules, weighing devices, acoustic sensors, etc. The measuring device thus comprises mechanical, electronic, optical components or element combinations thereof which are suitable for detecting and/or determining fish-size-relevant data. The measuring device comprises in particular such elements by means of which the height, length and/or width of the fish can be determined and/or with which the position of the tail root and/or the position of the dorsal fin can be detected, thus in particular can be directly detected and/or can be determined via corresponding calculation models. More preferably, the measuring device can also detect only the species of fish, which subsequently results in pre-adjustment of the gap S of the circular knives and/or variable setting of the gap S during recovery of the meat.

The detaching device for detaching the meat from the bone structure has the circular knives for performing the required knife cuts. In this case, the detaching device or the circular knives can expressly comprise further components, in particular mounting brackets for the circular knives as well as drive and control means. Preferably, the detaching device is used for cutting free or making the detaching cut or dorsal cut along the dorsal bones of the upper bone structure in the fish. In the case of the knife cuts, cutting free of dorsal spokes or other bones or bone structure portions associated with the bone structure is more preferably performed to subsequently separate the meat, particularly preferably with further separating means that are not the subject matter of the invention, for example with at least one separating device.

In particular, the control device serves the purpose of actuating and monitoring the circular knives with their drive and alignment on the one hand, and of configuring a variation of the circular knives by means of the data detected by the measuring device on the other hand, in order to dynamically adjust the circular knives to the respective fish anatomies. The control device comprises the mechanical components for configuring the change in distance and the (control electronics) components for varying the distance depending on the fish anatomy. More preferably, the control device comprises at least one computer unit which generates control signals for controlling and varying the width of the gap S.

The "width of the gap S" means the distance, preferably the shortest distance, between the at least two circular knives. Depending on the fish to be processed, the gap width can be individually set or varied, the respective variation being particularly preferably proportional to the respective fish parameters or fish anatomy of the fish to be processed. Variation of the width of the gap S is achieved by changing the position of the circular knives. At least one of the at least two circular knives can be varied relative to the transport path, i.e. the distance to the transport path can also be varied for only one knife, whereby the gap S is variable. The width of the gap S during processing preferably ranges from approx. 1 mm to approx. 20 mm, although, particularly preferably, values ranging from approx. 3 mm to approx. 8 mm are expedient for most of the fish to be processed. The variation in the width of the gap S or the circular knives relative to the transport path, adapted by means of the control device, is preferably within a range of ±10 mm at the most while the meat is being detached from the bone structure. Particularly preferably, the variation is in the range of a few millimetres, i.e. preferably in the range of 0.2 mm to 3.5 mm.

An expedient embodiment of the invention is characterised in that the circular knives are adapted to be adjustable synchronously with each other and/or substantially orthogonal to the transport path by means of the control device. In this way, it is possible to configure the gap width or the distance of the circular knives relative to each other to be uniform. For detaching or cutting free, the fish is transported along the transport path through the circular knives in transport direction T by means of the transport device, the fish or central bone (backbone) of the fish defining a transport plane in transport direction T in conjunction with the y axis. Orthogonal adjustability to the transport path means that the circular knives are adjustable orthogonal to the transport plane. Particularly preferably, the gap S is only variable in the gap width due to the orthogonal adjustability of the circular knives to the transport plane. The fish to be processed usually have a mainly symmetrical anatomy which makes a symmetrical arrangement of the cutting means preferable during processing. Due to the adjustability of the circular knives according to the invention, synchronous adjustability is likewise preferable, since this ensures the symmetrical arrangement of the cutting means relative to each other at all times. Synchronous adjustability also ensures that the cuts of the respective circular knives are uniform, resulting in a consistent cutting pattern. Synchronous adjustability also minimises the set-up effort, as a single adjustment automatically results in uniform adjustment of all cutting means. The substantially orthogonal, preferably linear adjustability of the circular knives relative to the transport path results in a predetermined range of possible gap widths. The adjustability within this linear arrangement is preferably continuously variable. The circular knives can preferably comprise further components, e.g. mounting brackets for the circular knives, which are configured to be movable and/or controllable for adjustability of the circular knives. "Synchronously adjustable" means that the at least two circular knives are adjustable at the same time, as one. "Adjustable" means that the rotary speed in particular is synchronously adjustable and that the distance to the transport path is synchronously adjustable as well. The circular knives can preferably be synchronised mechanically, electronically and/or magnetically. "Substantially orthogonal" means that the circular knives arranged on the detaching device or the detaching device itself are linearly adjustable perpendicular to the transport path and along this axis in the transport plane of the fish, with deviation of up to ±10° being possible.

A preferred development of the invention is characterised in that the circular knives are arranged relative to each other in such a manner and/or are adjustable relative to each other in such a manner that the gap S is v-shaped. In particular, the gap S is configured to be adjustable in a v-shape in and counter to the transport direction T. The embodiment of a v-shaped gap S, which is produced in particular by the position of the circular knives relative to each other, is desired, for example, in the region of the tail of the fish, e.g. to provide sufficient space for the fin seams in the tail region. The embodiment of the gap S in a v-shape can be produced by any position of the circular knives relative to each other. The gap S, for example, can be v-shaped in a view from above of the circular knives; alternatively, the gap S can also be v-shaped in a view from the front or an angled position of the circular knives relative to each other. To configure the v-shaped gap S, the two circular knives preferably have the point of the smallest distance at the lower apex of the circular knives. This position can achieve an increased recovery yield and at the same time minimise the occurrence of incorrect cuts. More preferably, the position of the circular knives relative to each other is configured and adapted to be variable in order to adjust the resulting v-shaped gap S as required.

According to a more preferred embodiment of the invention, the circular knives are configured and adapted as dorsal knives to perform a dorsal cut for detaching the dorsal meat of the fish. The circular knives are preferably configured as a pair of circular knives arranged opposite each other. More preferably, the dorsal cut enables the dorsal spokes to be cut free, with the dorsal meat subsequently being separated, if necessary by means of at least one separating device with separating means. The region between the tail fin and in particular the tail root, on the one hand, and the dorsal fin, on the other hand, is particularly fleshy especially in salmon, such that the configuration and adaptation of the circular knives for cutting free the dorsal cut, in particular the dorsal spokes, has a particularly significant effect on increased detachment when recovering meat compared to conventional apparatuses.

An expedient embodiment of the invention is characterised in that the transport device is configured and adapted to transport the fish tail-first along the transport path in transport direction T. The fish are preferably transported tail-first and with the open and gutted abdominal cavity facing downwards along a transport path in transport direction T by means of the transport device. As a result of being transported tail-first, when cut by means of the circular knives during the recovery of meat, the gap width S is more preferably increased gradually along the bone structure based on the anatomy of the fish which results in an improved cutting control and reduces the risk of damage.

A preferred development of the invention is characterised in that the control device comprises a cam control, said cam control comprising a cam disc driven by means of a control drive unit to change the position of the circular knives. The cam control of the control device provides a convenient solution to controlling the distance of the circular knives relative to each other or thereby adjusting the width of the gap S as required. To change the gap S, the cam control is configured in operative connection with the controllably moveable circular knives, for example in that the circular knives comprise a pin element for engaging with the cam control. The cam control with the cam disc is driven by the control drive unit and enables the generation of a rotary movement of the cam disc. The movement of the cam disc is generated by means of the control drive unit, this latter more preferably being configured and adapted to execute a movement rotating towards the left and right. In a further preferred embodiment, only a single cam disc is provided for the at least two circular knives, such that synchronous control of the circular knives and uniform variation of the distance of the circular knives to the transport path is provided by the cam disc acting equally on both circular knives. The cam control preferably comprises a cam gear in order to perform different movement sequences and thus position changes of the circular knives. For example, the control drive unit can be configured and adapted as a pivot drive to reliably drive or control the cam disc in a predetermined range.

A preferred embodiment is characterised in that, on the one hand, a defined gap S can be preset by means of the cam disc and, on the other hand, a variable gap S can be formed automatically as a function of the fish anatomy detected, in particular the height, length and/or width of the fish, while the meat is being detached from the bone structure of the fish. Automatic variation of the gap S results in a most complete possible recovery of the meat of the fish, since the circular knives can be adapted to the fish anatomy over the entire course of recovery. For this purpose, the control drive unit preferably does not execute a constant or complete rotary movement of the cam disc but rather a customised movement of the cam disc depending on the fish anatomy detected, in order, on the one hand, to preset the gap S before the fish are processed which is set up by a movement of the cam disc and accompanying control of the circular knives relative to each other, and, on the other hand, to vary the gap S while the fish are being processed which is also set up by a movement of the cam disc and associated control of the circular knives relative to each other. Overall, the cam disc is thus set up to be rotatable about its rotational axis in both directions by means of the control drive unit, with an increase in the gap S preferably being set up during rotary movement in the one direction and a reduction in the gap S preferably being set up during rotary movement in the other direction. Variation of the gap S takes place "automatically" within the meaning of the invention in that the control device or the cam control is linked to the measuring device and the width of the gap S is varied depending on the fish anatomy detected. In this case, the desired knife cut of the circular knives will preferably be performed based on the fish anatomy data detected, resulting in the variation of the gap S. The fish anatomy forms the basis of the automatic knife cut, in that, for example, the height, length and/or width of the fish can be used to infer the thickness of the backbone and/or dorsal spokes to be expected, in order to align the circular knives accordingly therewith. Moreover, automatic variation of the width of the gap S can be adjusted using knowledge of the corresponding fish anatomy in conjunction with customer requirements for the end product (e.g. maximum possible meat recovery or product as boneless as possible).

A preferred development of the invention is characterised in that the cam disc driven by the control drive unit comprises at least one circumferential cam which is set up to control the gap S, it being possible, on the one hand, to adjust a static formation of the gap S before the meat is detached from the bone structure of the fish and it being possible to adjust a dynamic formation of the gap S while the meat is being detached from the bone structure of the fish, in that in each case the at least one circular knife is operatively connected to the cam disc via a movably arranged circular knife receiving element. The circumferential cam enables a predetermined setting option for the gap S in that the circumferential cam is actuated according to the desired gap width. If no variation of the gap width is provided, i.e. a static configuration of the gap S, the circular knife remains in the position. For a variation of the gap width, a position change takes place within the circumferential cam. The circumferential cam is preferably configured and adapted as a groove-guide cam with a pin element guided therein. For this purpose, the cam disc comprises at least one groove guide for forced guidance of the pin element which is in operative connection with the circular knives, said pin element being configured and adapted to arrange adjustment/alteration of the width of the gap S, in that at least one of the circular knives in the circular knife receiving element is moved to the transport path. The circular knife receiving elements are configured, for example, as carriages with receptacles for circular knives which can be moved in a predetermined range to set up the variation of the gap S. Particularly preferably, the cam disc comprises two groove guides for receiving one pin element each in order to adjust the circular knives synchronously, it being possible to execute a rotary movement about the axis of rotation in both directions by means of the drive unit. The circular knife receiving element can preferably be driven rotatably in order to drive the circular knives. Alternatively, the circumferential cam can also be generated by having a spring element in operative connection with the cam disc, which spring element is elastically deformable, and it being possible to generate control of the gap S by expansion (positive or negative).

In a further advantageous embodiment of the invention, the control drive unit comprises an adjusting drive. The adjusting drive allows the cam disc to be controlled as required which, on the one hand, allows the gap S to be adjusted quickly and, on the other hand, allows the gap S to be varied to adapt to the fish anatomy. In this way, there is a greater range when varying the gap width, since the cam disc can be started up more quickly, more slowly or with an adjusted application of force. The adjusting drive is preferably configured as a servomotor. However, other adjusting drives or combinations of different systems can be used, for example pneumatic, hydraulic, electrical or electromagnetic components, to control and regulate the drive unit.

A further expedient embodiment of the invention is characterised in that the at least two rotatingly driven circular knives are set up to be drivable by a single circular knife drive unit. Driving the two circular knives by means of a single circular knife drive unit reduces the number of drive units required for the apparatus and contributes to a more compact design and a lower degree of complexity, which in turn contributes to a cost-effective design. At the same time, a single circular knife drive unit makes it easier to drive both circular knives synchronously which contributes, for example, to a uniform cutting pattern.

In a further advantageous embodiment of the invention, the circular knife drive unit is configured and adapted to drive the circular knives synchronously, each of the circular knives being drivable by a separate drive means which is operatively connected to the circular knife drive unit. The synchronous drive ensures a uniform cutting speed of the circular knives which contributes to consistent qualities of the fillets or meat to be recovered. The use of two drive means, which are preferably operatively connected to the circular knife drive unit, results in an even distribution of power to the circular knives. Particularly preferably, the power from a single power transmission means of the circular knife drive unit is transferred equally to the two drive means to ensure that the circular knives are driven uniformly. The drive means can preferably be selected from belts, bands, chains, shafts, etc. or combinations thereof. Advantageously, the circular knives can also be driven with separate servomotors which can be electronically linked to each other, for example, to generate synchrony. This ensures that the speed of the knives can be regulated in a controlled manner. This allows the knife speeds to be kept at a constant speed with varying resistances.

According to an advantageous embodiment of the invention, the apparatus further comprises a control unit, electrically connected to the measuring device and the control device, which is configured and adapted to detect and/or process fish anatomy data detected by the measuring device, in particular the height, length and/or width of the fish, and to actuate the control drive unit for adjusting the gap S according to the respective fish anatomy, in particular the height, length and/or width of the fish, in that the control unit actuates the control drive unit in such a manner as to adjust the circulation of the cam disc in a predetermined angular velocity profile. The control unit preferably comprises at least one computer unit with a memory unit for storing and/or processing the fish anatomy data of the fish detected by the measuring device. By means of the control unit, it is possible to calculate a customised adjustment or variation of the gap S and to control it by means of the cam control.

In a further preferred embodiment of the invention, the apparatus further comprises at least one input unit, configured to adjust the distance of at least one of the at least two circular knives to the transport path in order to adjust the width of the gap S before the meat is detached from the bone structure and/or to adjust the width of the gap S while the meat is being detached from the bone structure, and at least one output unit to output the adjustment of the distance entered by the input unit. The input unit allows the width of the gap S to be adjusted, preferably a manually entered adjustment, depending on the fish to be processed. Depending on the embodiment of the apparatus or on its use, it can be expedient in the case of fish to only detach meat in a certain region, for example in the case of special quality requirements. In this way, the meat is detached depending on the fish anatomy, but only in the previously adjusted region. The output unit outputs the adjusted regions to the user or shows the user the regions to be adjusted, preferably by means of visual aids such as a monitor. Furthermore, the output unit can preferably contain the input unit in order to use it to carry out manual changes.

An expedient embodiment of the invention is characterised in that the input unit is configured and adapted to variably set the adjustment of at least one of the at least two circular knives to the transport path, the width of the gap S being adjustable by each of the at least two circular knives by a maximum of ±10 mm. In this way, the cut of the circular knives to be performed can be adjusted in advance by means of the input unit depending on the requirements or desired cutting pattern. "Variable" in this context means that the cutting curve of at least one of the circular knives can be manually adjusted via the input unit, i.e. that changes can be made to the cutting course originally provided by the measuring device. The variable adjustment preferably comprises values which are in the range of several mm, for example to bypass bones, cartilage, etc., which were more preferably detected, for example, by the measuring or a detection device. In addition or alternatively, the width of the gap S can be adjusted depending on the desired quality or desired subsequent further processing of the fish. The possibility of adjusting the gap S by means of the input unit means that the gap width can be changed in relation to the fish anatomy originally intended or calculated and detected by means of the measuring device. The gap can thus preferably be adjusted in a range of 1 mm to 10 mm relative to the pre-adjusted gap width, i.e. can be made larger or smaller, by moving the circular knives towards or away from the transport path in each case.

A further expedient embodiment of the invention is characterised in that the input unit is configured to set cutting profiles depending on the fish species in order to adjust the width of the gap S according to the fish species before and/or during detachment of the meat from the bone structure of the fish, it being possible to set variable adjustment of the gap S. Due to adjustment of the cutting profiles depending on the fish species, it is possible, for example, to predefine a range of the gap S within which the circular knives can be moved, thus reducing, for example, any computing power required for adjusting the circular knives relative to each other. Furthermore, it may be possible to perform specific cutting controls which are not primarily dependent on the overall fish anatomy but only depend, for example, on the length, height or width. Overall, the processing speed can be increased in this way and the computing or control effort for adjusting the circular knives can be reduced.

In a preferred embodiment of the invention, the measuring device comprises a detection device, the detection device having a sensor system for detecting the data of the fish, more preferably selected from the group of optical detection systems, rotary encoders, absolute encoders, X-ray systems and/or acoustic sensors (e.g. ultrasound).

More preferably, at least one further detaching device is arranged downstream of the apparatus according to the invention in order to carry out complete recovery of the dorsal meat from the bone structure of the gutted fish. Apparatuses for recovering meat from headed and gutted fish regularly comprise two detaching devices, the first detaching device being configured to perform cutting free of the upper bone structure (the dorsal spokes) and the further detaching device being configured to perform a flank cut for cutting free the lower bone structure (the ventral spokes). In this way, at least two connected fillets are regularly produced from a single fish; from each side of the fish. The apparatus according to the invention is used in particular to perform cutting free of the upper bone structure (the dorsal spokes).

Furthermore, the object is achieved by the method referred to hereinbefore which comprises the following further steps: Adjusting the width of the gap S depending on the fish anatomy detected by the measuring device, in particular the height, length and/or width of the fish, by means of a control device, and pre-adjusting the width of the gap S before the meat is detached from the bone structure by means of the control device, and varying the width of the gap S while the meat is being detached from the bone structure by means of the control device.

To avoid repetition, reference is made in connection with the method according to the invention to the merits already described in detail in connection with the apparatus according to the invention. They also apply by analogy to the specified method according to the invention.

An expedient embodiment of the invention is characterised by adjusting the circular knives synchronously with each other and/or substantially orthogonal to the transport path by means of the control device.

According to a more preferred embodiment of the invention, the fish are transported tail-first along the transport path in transport direction T by means of the transport device.

A preferred development of the invention is characterised by changing the position of the circular knives by driving a cam disc comprising the control device by means of a control drive unit.

An advantageous development of the invention is characterised by, on the one hand, pre-setting a defined gap S of the cam disc by means of the cam disc and, on the other hand, automatically forming a variable gap S by means of the cam disc while detaching the meat from the bone structure of the fish depending on the fish anatomy, in particular the height, length and/or width of the fish.

A preferred development of the invention is characterised by driving the cam disc by the control drive unit and, on the one hand, statically adjusting the gap S before detaching the meat from the bone structure of the fish and, on the other hand, dynamically adjusting the gap S while the meat is being detached from the bone structure of the fish by means of at least one circumferential cam of the cam disc by moving the at least one circular knife via a movably arranged circular knife receiving element in each case.

According to a preferred development, the at least two rotatingly driven circular knives are driven by a single circular knife drive unit.

Each of the circular knives is preferably driven by means of a separate drive means of the circular knife drive unit.

A further advantageous development of the invention is characterised by detecting and/or processing the fish anatomy data measured by the measuring device, in particular the height, length and/or width of the fish, by means of a control drive unit, electrically connected to the measuring device and the control device, and actuating of the control drive unit by the control unit to adjust the gap S according to the respective fish anatomy, in particular the height, length and/or width of the fish, by adjusting the circulation of the cam disc in a predetermined angular velocity profile.

According to a more preferred embodiment of the invention, the distance of at least one of the at least two circular knives to the transport path is adjusted by means of at least one input unit, by adjusting the width of the gap S before the meat is detached from the bone structure and/or by adjusting the width of the gap S while the meat is being detached from the bone structure, and outputting the adjustment of the distance entered by the input unit by means of at least one output unit.

An expedient embodiment of the invention is characterised by variably setting the adjustment of at least one of the at least two circular knives to the transport path, the width of the gap S being adjusted by each of the at least two circular knives by a maximum of ±10 mm.

A preferred development of the invention is characterised by variable adjustment of the width of the gap S by means of fish species-dependent cutting profiles of the input unit before and/or during detachment of the meat from the bone structure of the fish.

Particularly preferably, the method is carried out using an apparatus as disclosed herein.

The advantages and effects arising from this have already been described in connection with the apparatus, which is why reference will be made to the preceding passages to avoid repetitions.

BRIEF DESCRIPTION OF THE DRAWINGS

Further expedient and/or advantageous features, configurations and developments of the invention emerge from the description. Particularly preferred embodiments of the apparatus and the method are explained in greater detail with reference to the attached drawings. The drawings show.

DETAILED DESCRIPTION OF THE INVENTION

Figure 1:
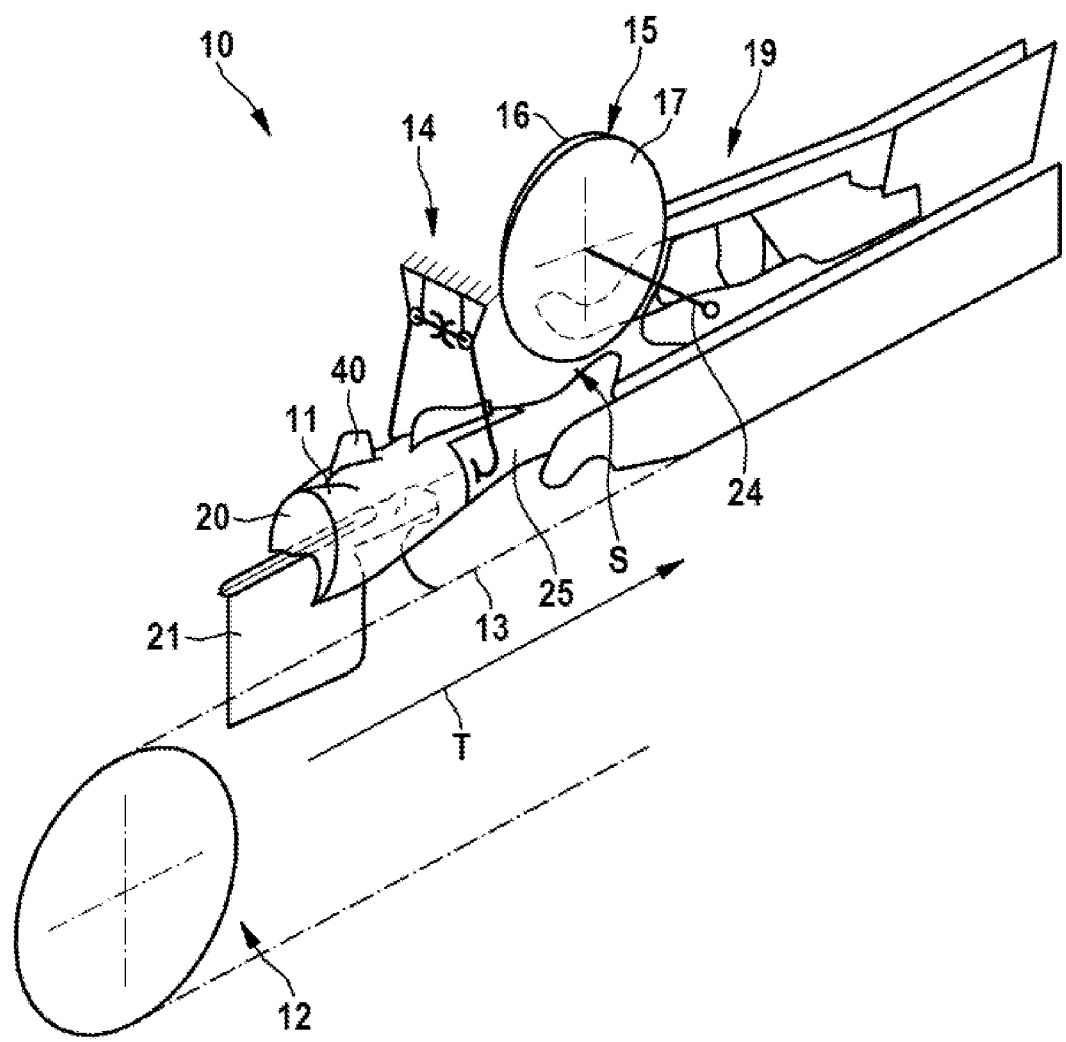
FIG. 1 a schematic representation of an apparatus according to the invention with a measuring device in a perspective view obliquely from above.

The apparatus shown in the drawings is used for automatically recovering meat from headed and gutted fish. In this case, the fish need not necessarily be headed or completely gutted for simplified processing, however the fish should be headed and partially or largely gutted. The invention is explained in greater detail based on cutting free dorsal spokes in salmon, in particular by means of dorsal knives configured as circular knives. The apparatus can also be used, however, in the same manner for other species of fish, in particular for recovering meat from white fish such as cod. The principle according to the invention can also be applied in principle to other detaching devices with circular knives, the circular knives being spaced apart parallel or in a V-shaped position to each other to form a gap. In this way, the principle is equally applicable, for example, to cutting free ventral spokes or other bones or bone structure portions associated with the bone structure.

FIG. 1 shows an apparatus 10 for automatically recovering meat 20 from headed and gutted fish 11, comprising a transport device 12 for transporting the fish 11 along a transport path 13 in transport direction T, a measuring device 14 for detecting the anatomy of the fish 11, and a detaching device 15 for detaching the meat 20 from the bone structure 18, the detaching device 15 comprising at least two rotatingly driven and controllably moveable circular knives 16, 17 which are spaced apart from each other on mutually opposing sides of the transport path 13 to form a gap S.

This apparatus 10 is characterised according to the invention in that the detaching device 15 comprises a control device 19, which is set up to adjust the width of the gap S depending on the fish anatomy detected by the measuring device 14, in particular the height, length and/or width of the fish 11, the control device 19 being configured to pre-adjust the width of the gap S before the meat 20 is detached from the bone structure 18 and the control device 19 being configured to vary the width of the gap S while the meat 20 is being detached from the bone structure 18.

When taken on their own or in combination with each other, the features and developments described below illustrate preferred embodiments. It is expressly pointed out that features which are summarised in the description or are described in a common embodiment can also further develop the apparatus 10 described above in a functionally independent manner.

Figure 2:
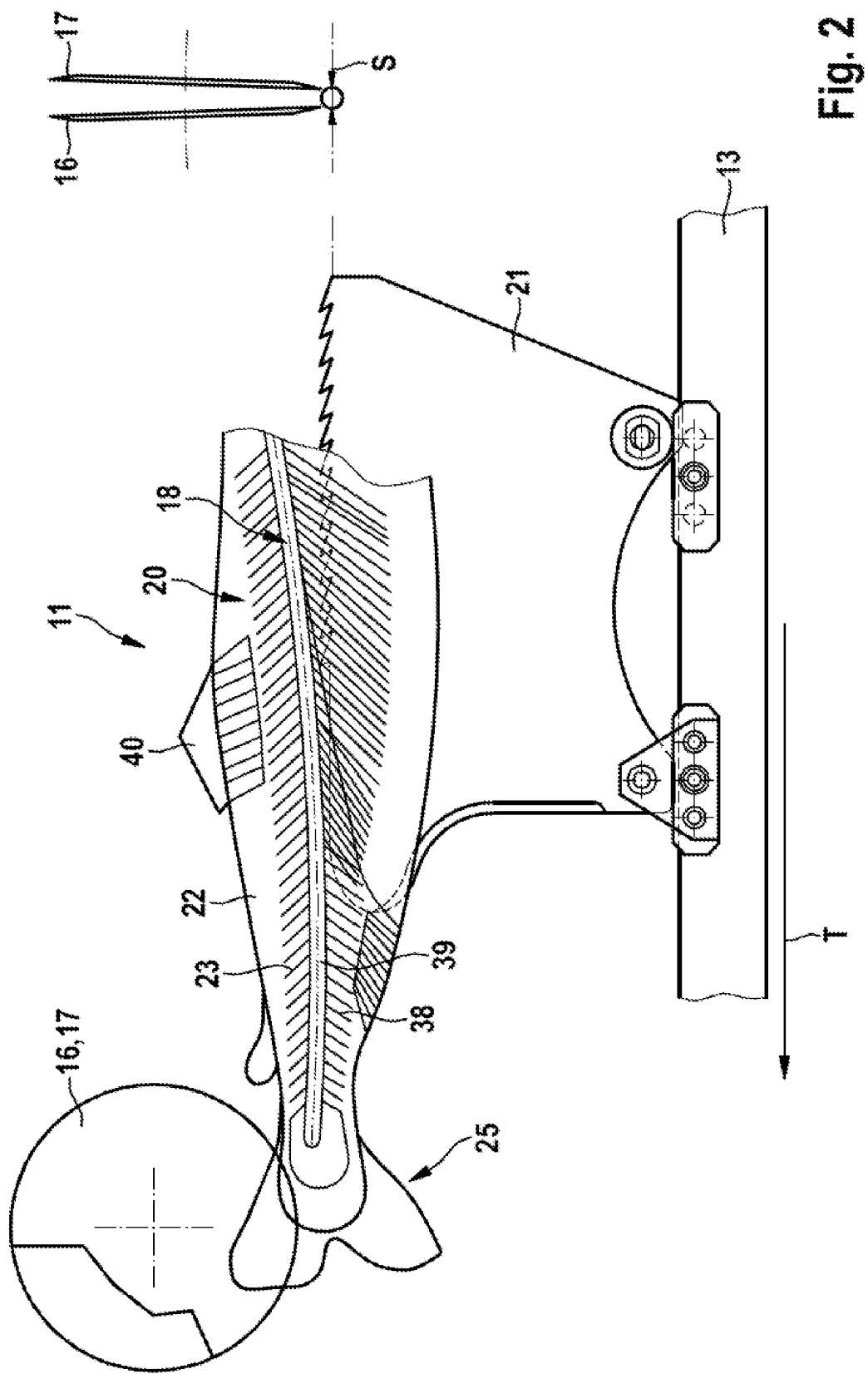
FIG. 2 a lateral view of a headed and gutted fish arranged on a holding apparatus and with stylised circular knives in the tail region of the fish.

In the apparatus 10 according to the invention, each fish 11 is manually or automatically positioned on a holding apparatus 21, as shown in FIG. 2, with the open and gutted abdominal cavity facing downwards. By way of example, FIG. 2 shows the structure of a fish 11 with the bone structure 18 during engagement of the circular knives 16, 17 in the region of the tail 25 of the fish 11. As shown in FIG. 2, the fish 11 to be preferably processed regularly have dorsal spokes 23 and ventral spokes 38 which, with the backbone 39 of the fish 11 among other things, form the bone structure 18. The meat 20 adhering to the bone structure 18 is recovered by the apparatus 10 according to the invention; or at least cutting free of the dorsal spokes 23 with the dorsal meat 22 is performed in order to subsequently perform recovery of all the meat 20 as completely as possible. The fish 11 can preferably be positioned in the longitudinal orientation on the holding apparatus 21 in order to transport them thereon by means of the transport device 12.

The transport device 12 is preferably configured and adapted to transport the fish 11 tail-first along the transport path 13 in transport direction T. The fish 11 with the holding apparatus 21 is transported in transport direction T by means of the transport device 12 to the detaching device 15. Before starting the detaching cut at the tail 25, the circular knives 16, 17 are arranged specifically relative to each other by means of the control device 19, as a result of which the width of the gap S is pre-adjusted before detaching the meat 20 from the bone structure 18. The specific pre-adjustment of the gap S takes place in each case depending on the fish anatomy of the fish 11 to be processed which is detected by the measuring device 14. The circular knives 16, 17, also known as dorsal knives, are preferably configured and adapted to perform a dorsal cut to detach the dorsal meat 22 of the fish 11. To do this, the circular knives 16, 17 cut free the dorsal spokes 23 of the bone structure 18 of the fish 11 to be processed by guiding the fish 11 through the gap S in such a manner that the circular knives 16, 17 detach the meat 20 or the dorsal meat 22 as closely as possible to the bone structure 18 of the dorsal spokes 23.

Figure 3:
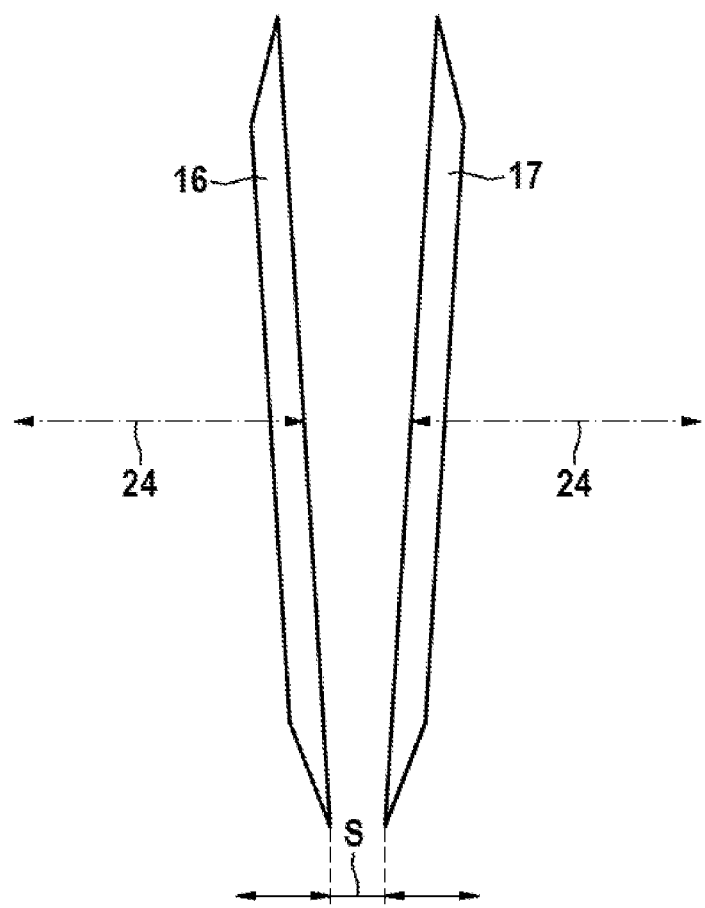
FIG. 3 a part of the detaching device with two circular knives forming a gap S in a view from the front.

As a result of continuously transporting the fish 11 in transport direction T, the cut begins as soon as the fish 11 or the dorsal meat 22 to be detached arrives in the operating area of the circular knives 16, 17. Preferably, the circular knives 16, 17 are set up by means of the control device 19 to be adjustable synchronously with each other and/or substantially orthogonal to the transport path 13, i.e. in a transport plane defined by the y axis and the transport direction T of the fish. The circular knives 16, 17 are configured to be adjustable orthogonal to the transport plane of the transport direction T, i.e. the circular knives 16, 17 can assume variable positions horizontally in the transport plane orthogonal to the transport path 13. As shown in FIG. 2 and FIG. 3, in a preferred embodiment the circular knives 16, 17 are arranged in such a manner relative to each other and/or are configured to be adjustable in such a manner relative to each other that the gap S is v-shaped. Alternatively, to each other by different positions of the circular knives 16, 17 to each other, the gap S can also be configured parallel or correspond to an inverted v. With the v-shaped configuration of the gap S, the angle of the circular knives 16, 17 is basically freely selectable and dependent on the fish 11 to be processed. In preferred embodiments, the angle can be varied during the cutting process. In FIG. 3, the two arrows schematically show the adjustability of the circular knives 16, 17 at the axis of rotation 24 of the circular knives 16, 17 which varies the width of the gap S which is indicated by the schematic arrows at the gap S.

In FIG. 1, the embodiment of the apparatus 10 comprises the measuring device 14 for detecting and/or determining the fish anatomy of the fish 11 or fish-size-relevant data of the fish 11. By means of the control device 19, the two circular knives 16, 17 can be controlled depending on the measured data detected and/or determined, namely in such a manner that the width of the gap S is variable. The variability of the gap S is substantially achieved by longitudinal displacement of the circular knives 16, 17 relative to each other in the horizontal. The detailed configuration of the measuring device 14 is not relevant to the invention and can therefore, in a known manner, comprise mechanical, electronic, optical or other known elements or element combinations which are suitable for detecting and/or determining fish-size-relevant data. To be able to control the circular knives 16, 17 individually during the detaching or dorsal cut, the fish anatomy or the fish-size-relevant data of each fish 11 can be detected/determined by means of the measuring device 14 and stored for further use. In detail, for example, the tail region 25 or tail root position and the position of the dorsal fin 40 can be detected with a photoelectric sensor. The fish 11 or the bone structure 18 can be measured completely before detaching/cutting. The individual measuring steps can be performed additionally during detaching/cutting. The measuring device 14 comprises in particular such elements by means of which the height, length and/or width of each fish 11 and/or the position of the tail 25 and/or the position of the dorsal fin 40 can be determined, thus in particular can be directly detected and/or can be determined via corresponding calculation models. The fish anatomy data thus determined are made available to the control device 19 by means of suitable processing and/or transmission methods, e.g. with the aid of a computer unit, not shown in detail in the figures, as a result of which the required adjustability and the required variability of the circular knives 16, 17 is calculated and carried out, e.g. also with the aid of a computer unit, not shown in detail in the figures.

Figure 4:
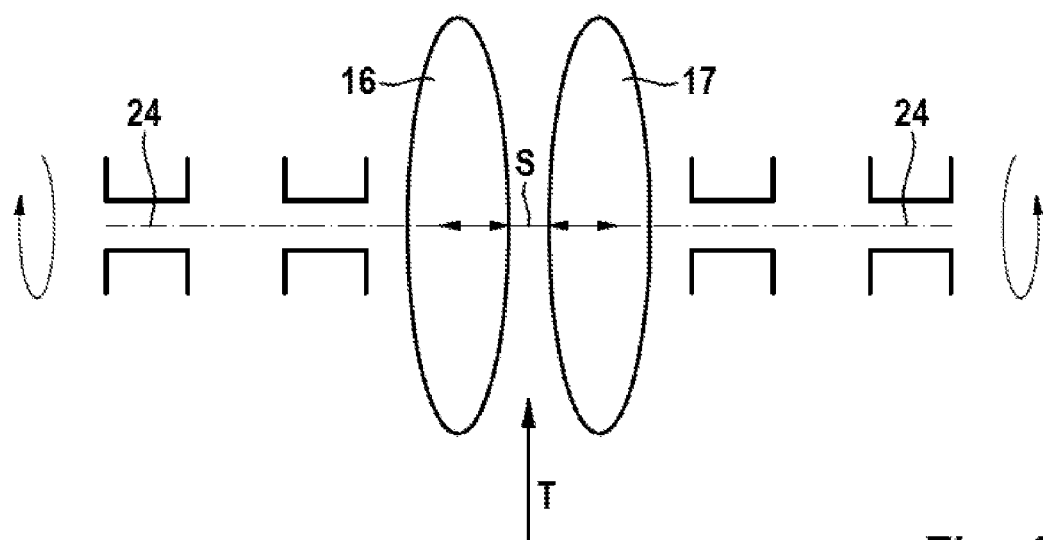
FIG. 4 the detaching device according to FIG. 3 in a view from above in a starting position.

FIG. 4 shows the detaching device 15 in a view from above. The variable width of the gap S is indicated by the schematic arrows on the axis of rotation 24 of the circular knives 16, 17. The width of the gap S is automatically variable during transport of the fish 11 through the controllably movable circular knives 16, 17 which are arranged opposite each other. For this purpose, the circular knives 16, 17 can be moved towards and away from each other, as a result of which the gap S increases or reduces in each case. When processing the fish 11 tail-first, the pre-adjusted width of the gap S generally corresponds substantially to the width of the tail 25 or the tail fin; when guiding the fish 11 through the pre-adjusted gap S, the gap width varies as required, as a result of which the gap S is regularly increased due to the bone structure 18 becoming wider.

Figure 5:
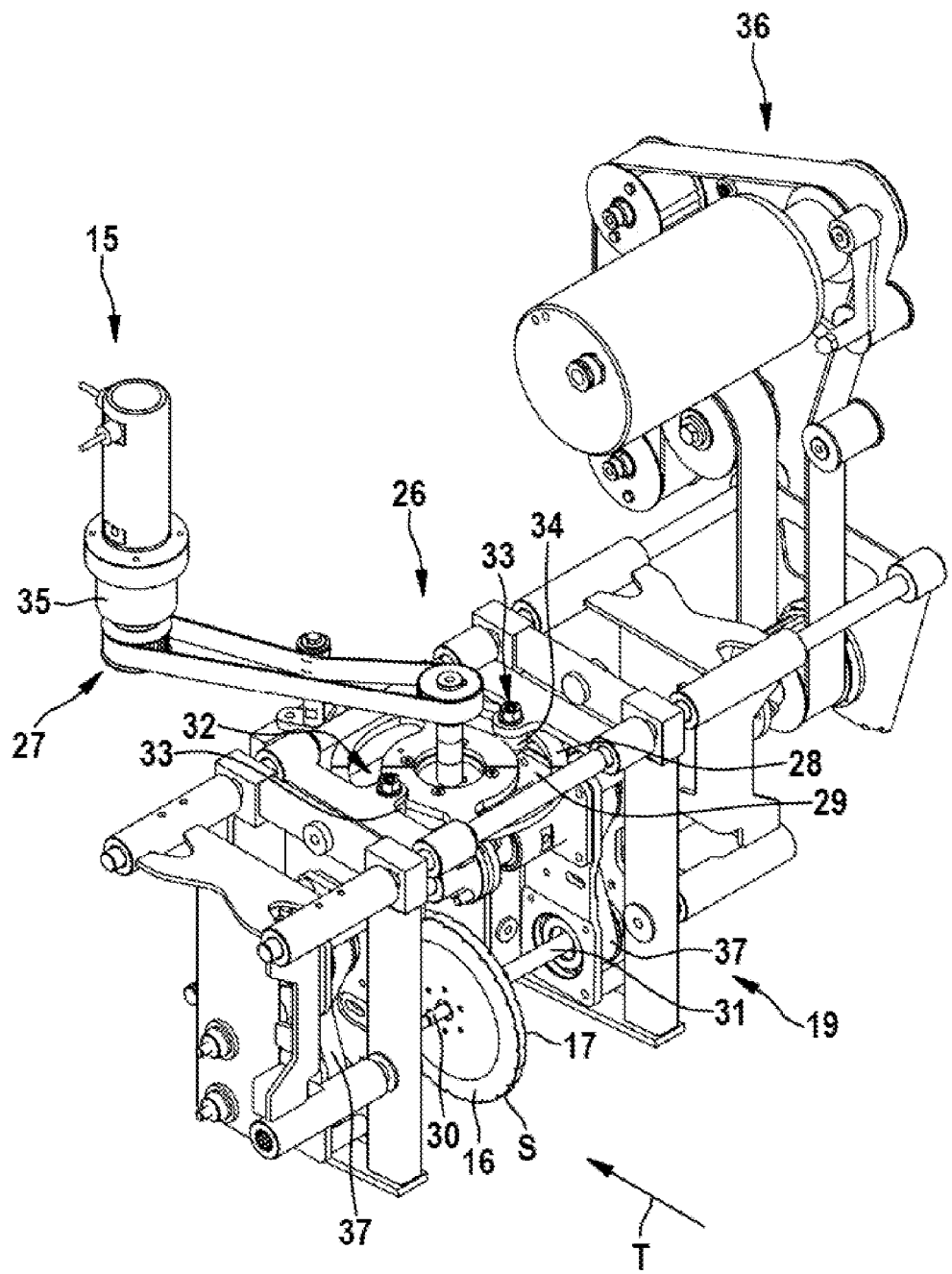
FIG. 5 a control device of the apparatus according to the invention in a perspective view obliquely from above.
Figure 6:
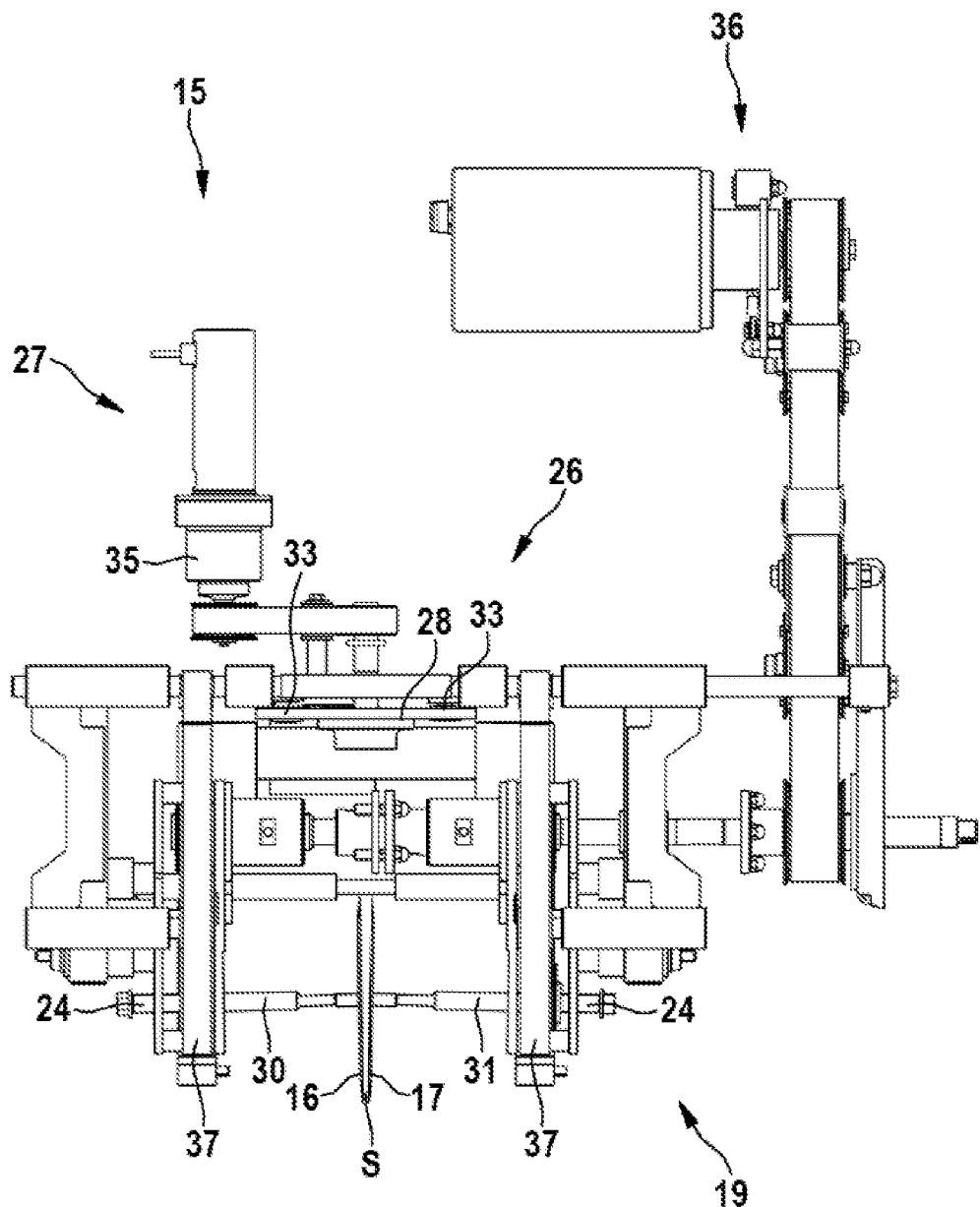
FIG. 6 the control device according to FIG. 5 with the detaching device in a view from the front.
Figure 7:
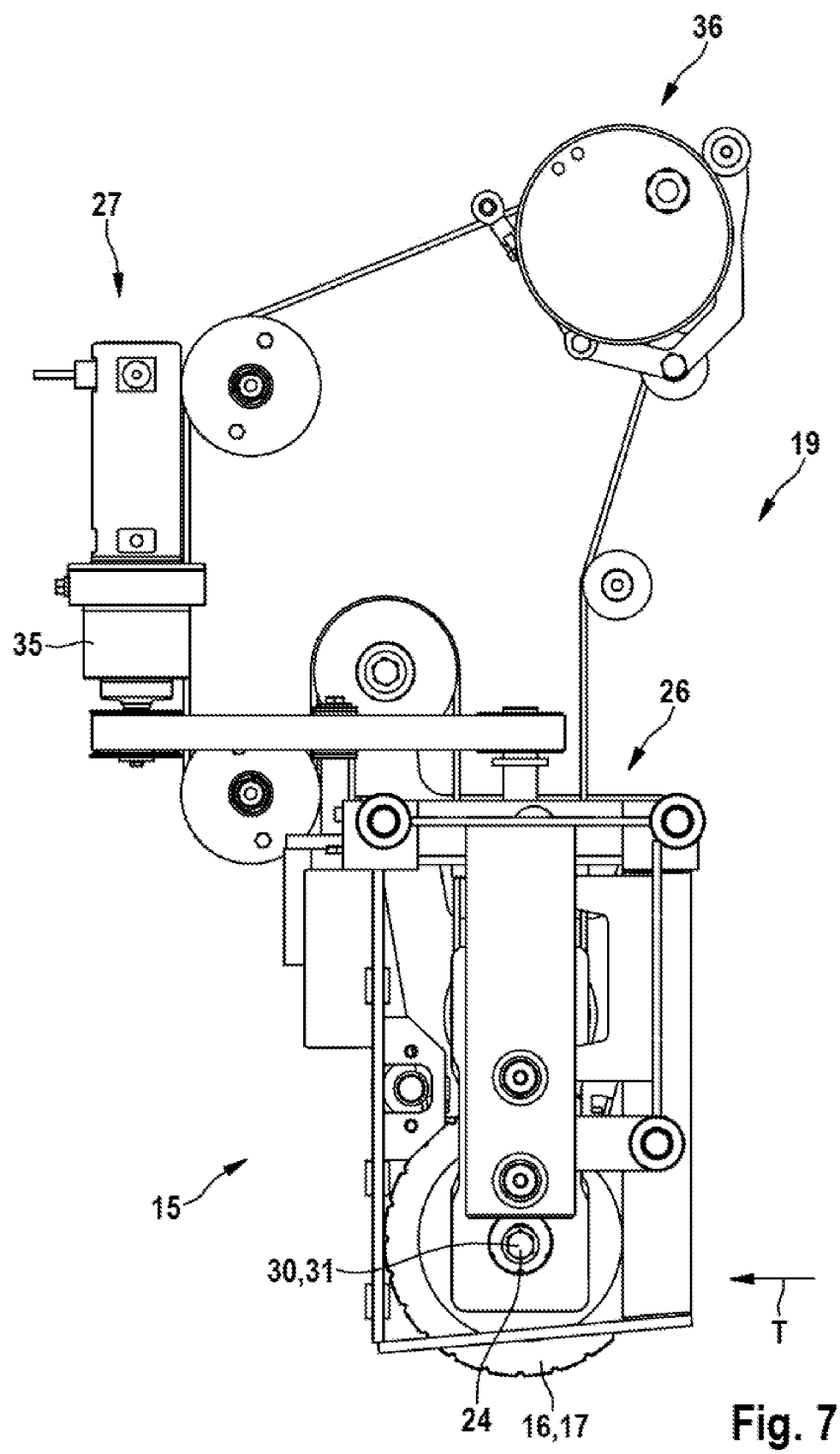
FIG. 7 the control device according to FIG. 5 in a lateral view.

The control device 19 preferably comprises a cam control 26, the cam control 26 comprising a cam disc 28 driven by means of a control drive unit 27 for changing the position of the circular knives 16, 17. FIGS. 5 to 7 show the detaching device 15 with the control device 19 in detail. Preferably, on the one hand, a defined gap S can be preset by means of the cam disc 28 and, on the other hand, a variable gap S can be formed automatically as a function of the fish anatomy detected, in particular the height, length and/or width of the fish 11, while the meat 20 is being detached from the bone structure 18 of the fish 11. In this case, the two circular knives 16, 17 are configured and adapted for cutting free the dorsal spokes 23. The cam disc 28 is configured to be movable in both directions along an axis of rotation of the cam disc 28 by the control drive unit 27. When the cam disc 28 is moved, a variation in the width of the gap S can be established by varying the distance between the circular knives 16, 17.

To vary the gap width, the cam disc 28 driven by the control drive unit 27 preferably comprises at least one circumferential cam 29 which is set up to control the gap S, it being possible, on the one hand, to adjust a static formation of the gap S before the meat 20 is detached from the bone structure 18 of the fish 11 and it being possible to adjust a dynamic formation of the gap S while the meat 20 is being detached from the bone structure 18 of the fish 11, in that in each case the at least one circular knife 16, 17 is operatively connected to the cam disc 28 via a movably arranged circular knife receiving element 30, 31. To establish the operative connection between the cam disc 28 and the circular knives 16, 17 or the circular knife receiving elements 30, 31, further means or elements are preferably provided which cooperate with the cam disc 28 and the circumferential cam 29. In the embodiment according to the invention of FIG. 5 to FIG. 7, the circumferential cam 29 has at least one groove 32 into which at least one scanner 33, also known as a pin element, is arranged to engage. Preferably, in each case a groove 32 with a respective scanner 33 is provided to control each of the circular knives 16, 17. The scanner 33 preferably has a guide roller 34, providing for low-friction movement in the groove 32. By means of the scanner 33, a displacement of the circular knife receiving elements 30, 31 or the circular knives 16, 17 is set up, which is initially brought about by the cam control 26. To transmit the forces occurring, force transmission elements, such as gears, not shown in detail in the figures, can be provided which are configured and adapted to transmit prevailing forces between different components and/or to undertake the control of forces occurring. Furthermore, the control drive unit 27 can comprise an adjusting drive 33 to provide a wider range of adjustment options for the width of the gap S. With the adjusting drive 33 it is possible to set up customised control of the cam control 26 which, on the one hand, allows the gap S to be adjusted quickly and more delicately and, on the other hand, allows the gap S to be varied to adapt to the fish anatomy. In this way, there is a greater range when varying the gap width, since the cam disc 28 can be approached more quickly, more slowly or with an adjusted application of force. The adjusting drive 33 is preferably configured as a servomotor, not shown in detail in the figures. For example, the servomotor can be used to vary the gap S over the entire cutting pattern when recovering the meat 20.

To actuate and drive the at least two circular knives 16, 17, they are preferably set up to be drivable by a single circular knife drive unit 36. The circular knife drive unit 36 is configured in FIG. 5 to FIG. 7 as a motor. The circular knife drive unit 36 is configured and adapted to drive the circular knives 16, 17 synchronously, each of the circular knives 16, 17 being drivable by a separate drive means 37 which is operatively connected to the circular knife drive unit 36.

In a further embodiment which is not explicitly shown, the apparatus 10 can further comprise a control unit, electrically connected to the measuring device 14 and the control device 19, which is configured and adapted to detect and/or process the fish anatomy data detected by the measuring device 14, in particular the height, length and/or width of the fish 11, and to actuate the control drive unit 27 for adjusting the gap S according to the respective fish anatomy, in particular the height, length and/or width of the fish 11, in that the control unit actuates the control drive unit 27 in such a manner as to adjust the circulation of the cam disc 28 in a predetermined angular velocity profile.

In a preferred embodiment, the apparatus 10 comprises an input unit, not shown in the figures, configured to adjust the distance of at least one of the at least two circular knives 16, 17 to the transport path 13 in order to adjust the width of the gap S before the meat 20 is detached from the bone structure 18 and/or to adjust the width of the gap S while the meat 20 is being detached from the bone structure 18, and at least one output unit, also not shown in the figures, to output the adjustment of the distance entered by the input unit.

All embodiments which have been described in connection with the circular knives 16, 17, also apply correspondingly to ventral knives, not shown in the figures, which are preferably configured and adapted as circular knives for cutting free the ventral spokes 38 or other bones or bone structure portions associated with the bone structure 18. This also applies to the method, not described in detail, for automatically recovering meat 20 from headed and gutted fish 11, in particular for cutting free the dorsal spokes 23.

The invention claimed is:

1. An apparatus for automatically recovering meat from headed and gutted fish, the apparatus comprising:
   a transport device for transporting the fish along a transport path in a transport direction T;
   a measuring device for detecting an anatomy of the fish;
   a single circular knife drive unit;
   a control unit electrically connected to the measuring device; and
   a detaching device for detaching the meat from a bone structure of the fish, wherein the detaching device comprises at least two rotatingly driven and controllably moveable circular knives which are spaced apart from each other on mutually opposing sides of the transport path to form a gap S, the at least two circular knives driven by the single circular knife drive unit;
   wherein:
   the detaching device comprises a control device set up to adjust a width of the gap S depending on a height, length and/or width of the fish detected by the measuring device;
   the control device is configured to pre-adjust the width of the gap S before the meat is detached from the bone structure and wherein the control device is configured to vary the width of the gap S while the meat is being detached from the bone structure;
   the control device comprises a cam control, the cam control comprises a cam disc driven by a control drive unit for changing the position of the circular knives; and
   the control unit actuates the control drive unit in such a manner as to adjust the circulation of the cam disc in a predetermined angular velocity profile.

2. The apparatus of claim 1, wherein the circular knives are set up to be adjustable synchronously with each other by the control device.

3. The apparatus of claim 1, wherein the circular knives are arranged relative to each other and/or are configured to be adjustable relative to each other in such a manner that the gap S is v-shaped.

4. The apparatus of claim 1, wherein the circular knives are configured and adapted as dorsal knives to perform a dorsal cut for detaching dorsal meat of the fish.

5. The apparatus of claim 1, wherein the transport device is configured and adapted to transport the fish tail-first along the transport path in transport direction T.

6. The apparatus of claim 1, wherein:
   a defined gap S is preset by the cam disc;
   a variable gap S is formed automatically as a function of the height, length and/or width of the fish that is detected while the meat is being detached from the bone structure of the fish; or
   a combination thereof.

7. The apparatus of claim 1, wherein:
   the cam disc is driven by the control drive unit and comprises at least one circumferential cam which is set up to control the gap S;
   a static formation of the gap S is adjusted before the meat is detached from the bone structure of the fish;
   a dynamic formation of the gap S is adjusted while the meat is being detached from the bone structure of the fish, in that in each case; and
   at least one of the circular knives is operatively connected to the cam disc via a movably arranged circular knife receiving element.

8. The apparatus of claim 1, wherein the control drive unit comprises a servo drive.

9. The apparatus of claim 1, wherein the single circular knife drive unit is configured and adapted to drive the circular knives synchronously, wherein each of the circular knives is drivable by a separate drive means which is operatively connected to the single circular knife drive unit.

10. The apparatus of claim 1, wherein the control unit includes at least one computer unit with a memory unit and is configured and adapted to detect and/or process the height, length and/or width of the fish detected by the measuring device, and to actuate the control drive unit for adjusting the gap S according to the respective height, length and/or width of the fish.

11. The apparatus of claim 1, further comprising at least one input unit, configured to adjust a distance of at least one of the at least two circular knives to the transport path in order to adjust the width of the gap S before the meat is detached from the bone structure and/or to adjust the width of the gap S while the meat is being detached from the bone structure, and at least one output unit to output the adjustment of the distance entered by the input unit.

12. The apparatus of claim 11, wherein the input unit is configured and adapted to variably set the adjustment of the distance of the at least one of the at least two circular knives to the transport path, wherein the width of the gap S is adjustable by each of the at least two circular knives by a maximum of ±10 mm.

13. The apparatus of claim 11, wherein the input unit is configured to set cutting profiles depending on the fish species in order to adjust the width of the gap S according to the fish species before and/or during detachment of the meat from the bone structure of the fish, wherein variable adjustment of the gap S is set.

14. A method for automatically recovering meat from headed and gutted fish, the method comprising:
   transporting the fish along a transport path in a transport direction T by a transport device;
   detecting a height, length and/or width of the fish, by a measuring device;
   detecting and/or processing the height, length and/or width of the fish measured by the measuring device, by a control drive unit electrically connected to the measuring device and a control device;
   synchronously adjusting, by the control device to control a width of a gap S depending on the height, length and/or width of the fish, at least two rotatingly driven and controllably moveable circular knives which are spaced apart from each other on mutually opposing sides of the transport path to form the gap S;
   detaching the meat from a bone structure of the fish by a detaching device, wherein the detaching device comprises the at least two rotatingly driven and controllably moveable circular knives;

changing the position of the circular knives by driving a cam disc which comprises the control device by the control drive unit; and actuating the control drive unit by the control unit to adjust the gap S according to the respective height, length and/or width of the fish, by adjusting the circulation of the cam disc in a predetermined angular velocity profile;

wherein the width of the gap S is pre-adjustable by the control device before the meat is detached from the bone structure and wherein the width of the gap S is changeable by the control device while the meat is being detached from the bone structure.

15. The method according of claim 14, the method further comprising adjusting the circular knives synchronously with each other substantially orthogonal to the transport path by the control device.

16. The method of claim 14, wherein transporting the fish comprises transporting the fish tail-first along the transport path in transport direction T by the transport device.

17. The method of claim 14, further comprising either:
pre-setting a defined gap S by the cam disc;
automatically forming a variable gap S by the cam disc while detaching the meat from the bone structure of the fish depending on the height, length and/or width of the fish; or
a combination thereof.

18. The method of claim 14, further comprising the driving of the cam disc by the control drive unit and either:
statically adjusting the gap S before detaching the meat from the bone structure of the fish;
dynamically adjusting the gap S while the meat is being detached from the bone structure of the fish by at least one circumferential cam of the cam disc by moving the at least one circular knife via in each case a movably arranged circular knife receiving element; or
a combination thereof.

19. The method of claim of 14, further comprising driving the at least two rotatingly driven circular knives by a single circular knife drive unit.

20. The method of claim 19, further comprising synchronously driving each of the circular knives by a separate drive means of the single circular knife drive unit.

21. The method of claim 14, further comprising adjusting a distance of at least one of the at least two circular knives to the transport path by at least one input unit by adjusting the width of the gap S before the meat is detached from the bone structure and/or by adjusting the width of the gap S while the meat is being detached from the bone structure, and outputting the adjustment of the distance entered by the input unit by at least one output unit.

22. The method according to claim 21, further comprising variably setting the adjustment of the distance of the at least one of the at least two circular knives to the transport path, wherein the width of the gap S is adjusted by each of the at least two circular knives by a maximum of ±10 mm.

23. The method of claim 21, further comprising variably adjusting the width of the gap S by cutting profiles depending on a fish species of the input unit before and/or during detachment of the meat from the bone structure of the fish.

* * * * *